(12) United States Patent
Ouellette et al.

(10) Patent No.: US 9,493,315 B2
(45) Date of Patent: Nov. 15, 2016

(54) OBJECT ARRAY LIFTING AND TRANSFERRING APPARATUS

(71) Applicant: Ouellette Machinery Systems, Inc., Fenton, MO (US)

(72) Inventors: Joseph F. Ouellette, Glendale, MO (US); Richard J. Ouellette, Fenton, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 44 days.

(21) Appl. No.: 14/686,432

(22) Filed: Apr. 14, 2015

(65) Prior Publication Data

US 2016/0304296 A1    Oct. 20, 2016

(51) Int. Cl.
| | |
|---|---|
| B25J 15/08 | (2006.01) |
| B65G 59/02 | (2006.01) |
| B66C 1/00 | (2006.01) |
| B25J 15/00 | (2006.01) |
| B29C 37/00 | (2006.01) |
| B29D 11/00 | (2006.01) |

(52) U.S. Cl.
CPC ............ *B65G 59/02* (2013.01); *B25J 15/0061* (2013.01); *B29C 37/0007* (2013.01); *B29C 37/0014* (2013.01); *B66C 1/00* (2013.01); *B29D 11/00057* (2013.01)

(58) Field of Classification Search
CPC ................ B65B 21/18; B65B 21/183; B65G 2201/0244; B65G 47/088; B65G 47/90; B65G 57/03; B65G 57/24
USPC ............... 294/87.1, 87.22; 414/792.7, 792.8, 414/792.9, 796.2, 796.5, 796.9; 53/247, 53/539, 543
See application file for complete search history.

(56) References Cited

U.S. PATENT DOCUMENTS

| | | | | |
|---|---|---|---|---|
| 2,561,536 A * | 7/1951 | Rowe | ...................... | B65B 21/18 294/196 |
| 2,898,716 A * | 8/1959 | Cella | ...................... | B65B 21/18 53/247 |
| 2,999,604 A * | 9/1961 | Chalich | ................... | B65B 21/12 294/100 |
| 3,069,035 A * | 12/1962 | Schwarz | ............... | B65B 21/183 198/803.7 |
| 3,881,762 A * | 5/1975 | Zappia | .................. | B65B 21/186 294/119.3 |
| 4,493,599 A * | 1/1985 | Hartness | .............. | B65G 59/005 294/87.1 |
| 5,060,455 A * | 10/1991 | Schmeisser | ............ | B65B 21/18 53/247 |
| 5,102,287 A * | 4/1992 | Johnson | ............... | B65G 47/907 294/116 |
| 6,210,093 B1* | 4/2001 | Hannen | ................ | B65G 47/902 198/468.2 |
| 6,431,817 B1* | 8/2002 | Simkowski | ............ | B65G 57/24 414/788.9 |
| 6,805,230 B2* | 10/2004 | Correggi | .............. | B65G 47/088 198/427 |
| 6,868,651 B1* | 3/2005 | Sorensen | ................ | B65B 5/065 294/119.1 |
| 7,798,763 B2* | 9/2010 | Ouellette | ............... | B65G 57/03 198/418.4 |
| 2003/0168873 A1* | 9/2003 | Lanfranchi | ............ | B65B 21/18 294/87.1 |

* cited by examiner

*Primary Examiner* — Gregory Adams
(74) *Attorney, Agent, or Firm* — Joseph M. Rolnicki; Evans & Dixon, L.L.C.

(57) ABSTRACT

A glass bottle array lifting and transferring apparatus is operable to vertically lift a two-dimensional arrayed layer of bottles, and in particular glass bottles, and transfer the lifted arrayed layer of bottles horizontally from a stack of bottles. More specifically, the present invention pertains to an apparatus having pluralities of pairs of rails that are operable to lift a top, two-dimensional arrayed layer of glass bottles from the top of a stack of bottles on a pallet, then transfer the lifted bottles horizontally to a position over an accumulator table and then lower the bottles onto the surface of the accumulator table.

20 Claims, 9 Drawing Sheets

OBJECT ARRAY LIFTING AND TRANSFERRING APPARATUS

FIELD OF THE INVENTION

The present invention pertains to an apparatus that is operable to vertically lift a two-dimensional array of objects such as containers or bottles, and in particular glass bottles, and transfer the lifted array of objects horizontally from a stack of the objects. More specifically, the present invention pertains to an apparatus that is operable to lift a two-dimensional array of glass bottles from the top layer of stacked bottles on a pallet and then transfer the lifted bottles horizontally to a position over an accumulator table and then lower the bottles onto the surface of the accumulator table.

BACKGROUND

A bulk depalletizer is an apparatus that removes objects, for example bottles from a stack of objects on a pallet and transfers the objects to an accumulator table. From the accumulator table the objects can be conveyed to a downstream station where the objects are further processed.

For apparatus that depalletize relatively heavy objects, for example glass bottles or liquid filled glass bottles, the apparatus has a specific construction that enables the apparatus to lift a two-dimensional array of glass bottles vertically from the stacked bottles on a pallet, horizontally transfer the lifted two-dimensional array of glass bottles from the stack of bottles on the pallet to a position over an accumulator table, and then vertically lower the two-dimensional array of glass bottles onto the accumulator table.

Depalletizer apparatus of the above type have been developed with bottle row gripping assemblies that have long, tubular, air impervious bladders. In operation of the apparatus, pairs of deflated bladders are positioned on opposite sides of each row of bottles in the two-dimensional array of bottles at the top of the stack of bottles. The pairs of bladders are then inflated. The inflated bladders on the opposite sides of each row of bottles engage against the opposite sides of the row of bottles and grip the row of bottles between the pair of inflated bladders. The inflated pairs of bladders are then lifted, lifting the two-dimensional array of bottles from the top of the stack of bottles on the pallet. The inflated pairs of bladders are then moved horizontally to move the lifted array of bottles from over the stack of bottles and to position the lifted array of bottles over an accumulator table. The inflated pairs of bladders are then lowered to position the lifted array of bottles on the surface of the accumulator table.

Depalletizing apparatus of the type described above are disadvantaged in that a substantial supply of air is needed to fully inflate the pairs of elongate bladders on the opposite sides of the rows of bottles with sufficient pressure in the bladders to firmly grip the rows of bottles between the pairs of bladders when lifting and transferring the heavy glass bottles.

SUMMARY OF THE INVENTION

The glass bottle array lifting and transferring apparatus of this disclosure overcomes disadvantages associated with known bulk depalletizers that lift and transfer two-dimensional arrays of glass bottles by significantly reducing the supply of air under pressure needed to grip rows of glass bottles in a two-dimensional array of glass bottles, lift the array of glass bottles from a stack of glass bottles on a pallet, and then transfer the lifted array of glass bottles to an accumulator table.

Although the lifting and transferring apparatus is described herein as lifting a two-dimensional array of glass bottles, it should be understood that the apparatus could be used to lift and transfer a two-dimensional array of any type of objects. It is not intended that the apparatus be limited to use with glass bottles.

The apparatus includes a carrier that suspends a plurality of bottle gripping assemblies. The carrier is moveable horizontally along a horizontal line of movement between a position of the carrier above an accumulator table, and a position of the carrier above stacked two-dimensional arrays of bottles on a pallet adjacent the accumulator table. With the carrier positioned above the pallet of stacked bottles, the gripping assemblies are positioned above the rows of bottles in the two-dimensional top layer array of bottles stacked on the pallet. The carrier is also moveable along a first vertical line of movement above the stack of bottles on the pallet, and a second vertical line of movement above the accumulator table.

A hoist device supports the carrier. The hoist device is operable to selectively raise and lower the carrier vertically along the first vertical line of movement, and selectively raise and lower the carrier along the second vertical line of movement.

A motive device supports the hoist device. The motive device is operable to selectively move the hoist device and the carrier horizontally along the horizontal line of movement. Operation of the motive device selectively positions the carrier above the two-dimensional top layer array of bottles stacked on the pallet, and above the accumulator table.

A plurality of bottle gripping assemblies are supported by the carrier. Each of the bottle gripping assemblies is comprised of a first rail and a second rail. The first and second rails are supported by the carrier for vertical movement of the rails with vertical movement of the carrier, and for horizontal movement of the rails with horizontal movement of the carrier.

Each bottle gripping assembly is also comprised of at least one actuator that is operatively connected to the first rail and the second rail of the bottle gripping assembly. The actuator is operable to move the first rail and the second rail away from each other to first relative positions, and the actuator is operable to move the first rail and the second rail toward each other to second relative positions.

In operation of the apparatus, the actuators of each bottle gripping assembly are operated to move the first and second rails of the bottle gripping assembly away from each other to their first relative positions. The hoist device is then operated to move the carrier and the plurality of gripping assemblies upwardly to an elevation that enables the carrier and the plurality of gripping assemblies to pass over the stack of bottles on a pallet positioned adjacent the accumulator table.

The motive device is then operated to move the hoist device, the carrier and the plurality of bottle gripping assemblies away from the accumulator table and to a position where the plurality of bottle gripping assemblies are above the stacked bottles on the pallet. This positions the plurality of gripping assemblies above the rows of bottles in the top two-dimensional array layer of bottles stacked on the pallet. This positions the first rail and second rail of each gripping assembly above and on opposite sides of a row of bottles in the top layer of bottles.

The hoist device is then operated to lower the carrier and the plurality of bottle gripping assemblies downwardly toward the top layer of bottles stacked on the pallet. The movements and positioning of the hoist device and carrier relative to the bottles stacked on the pallet are monitored and controlled by a plurality of photoelectric switches at various positions on the apparatus. The hoist device is controlled by the photoelectric switches and a control system of the apparatus to position each gripping assembly on opposite sides of a row of bottles in the top layer of bottles stacked on the pallet.

The actuators of the plurality of bottle gripping assemblies are then operated to cause the first and second rails of each gripping assembly to move from their first relative positions to their second relative positions. This results in the first and second rails of each gripping assembly of the plurality of bottle gripping assemblies engaging against opposite sides of the bottles in each row of bottles in the top layer of bottles stacked on the pallet. Each of the first and second rails of the plurality of gripping assemblies firmly grip a row of bottles between the first and second rails.

The hoist device is then operated to move the carrier and the plurality of gripping assemblies vertically upward. This lifts the rows of bottles in the top layer of bottles stacked on the pallet above the remaining bottles stacked on the pallet.

The motive device is then operated to move the hoist device, the carrier, and the rows of bottles now gripped by the plurality of gripping assemblies horizontally until the gripped rows of bottles are positioned above the accumulator table. The photoelectric switches check that the table surface is clear.

The hoist device is then operated to move vertically downwardly to position the gripped rows of bottles on the accumulator table. With the pluralities of rows of bottles positioned on the accumulator table, the actuators are then operated to move the pairs of first and second rails of each gripping assembly away from each other to their first relative positions, thereby releasing the rows of bottles from the plurality of gripping assemblies.

The hoist device then elevates the carrier and the plurality of bottle gripping assemblies vertically upward to a position above the accumulator table. The sequence of events described above are then repeated to move the gripping assemblies over the stack of bottles on the pallet, lower the gripping assemblies onto the stack of bottles on the pallet, to grip the top layer of bottles in the next stack of bottles remaining on the pallet and move the top layer of bottles to the accumulator table.

In the above manner, the apparatus enables depalletizing rows of bottles from a stack of bottles on a pallet without requiring a substantial supply of air under pressure as was needed in prior depalletizing apparatus. In contrast, the apparatus needs only a small supply of pressurized air to operate the actuators associated with the first and second rails of each bottle gripping assembly.

DESCRIPTION

Although the lifting and transferring apparatus is described herein as lifting a two-dimensional array of glass bottles, it should be understood that the apparatus could be used to lift and transfer a two-dimensional array of any type of objects. It is not intended that the apparatus be limited to use with glass bottles.

Figure 1:
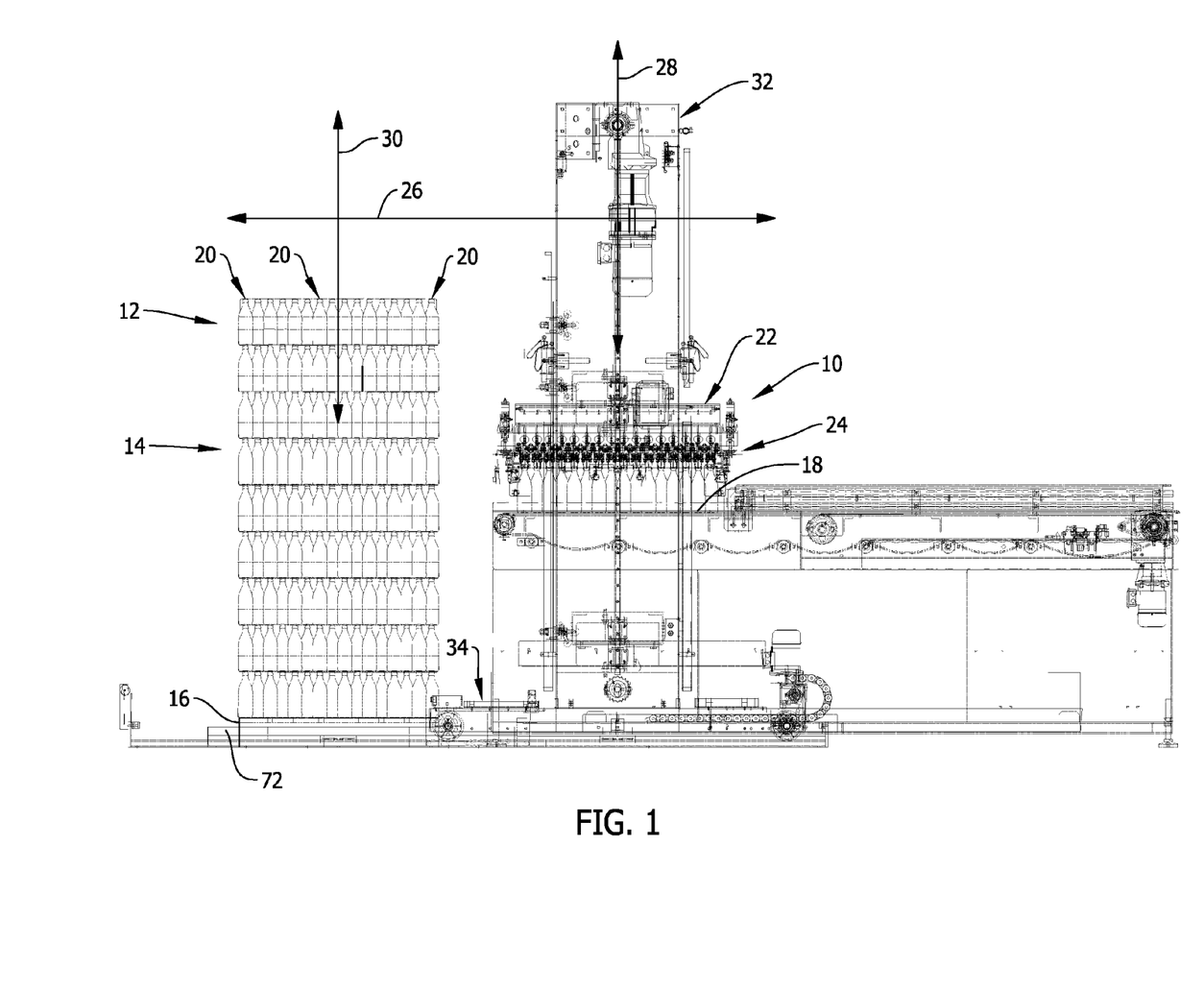
FIG. 1 is a side elevation view of the glass bottle array lifting and transferring apparatus suspended by a hoist device above an accumulator table and adjacent a stack of glass bottles on a pallet.
Figure 3:
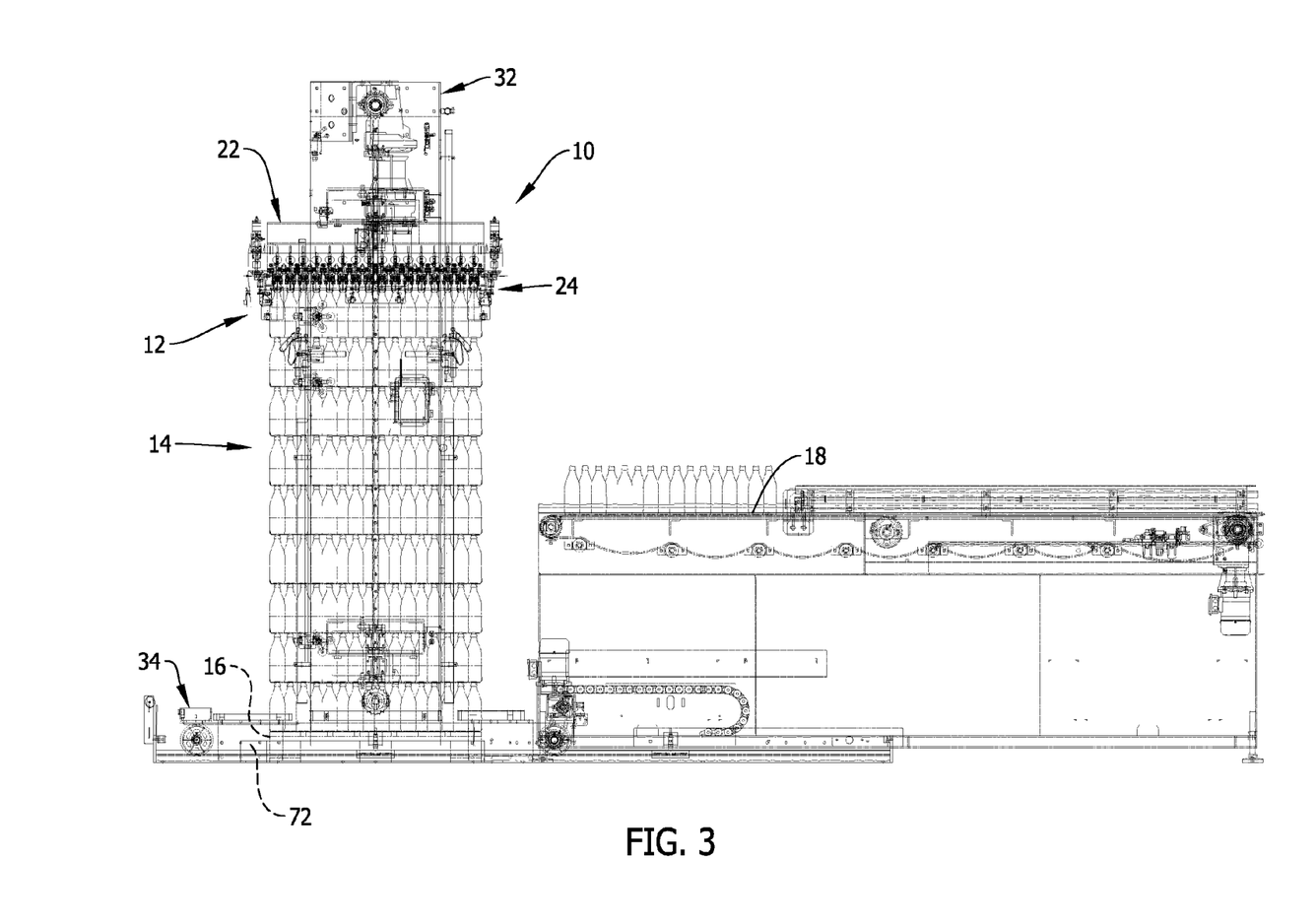
FIG. 3 is a side elevation view of the glass bottle array lifting and transferring apparatus suspended by the hoist device above the stack of glass bottles on the pallet.

FIGS. 1 and 3 are side elevation views of the glass bottle array lifting and transferring apparatus 10 in an operative environment of the apparatus 10 where the apparatus 10 lifts two-dimensional arrayed layers of bottles 12 from the top of a stack of bottles 14 on a pallet 16, and transfers the lifted array of bottles 12 to an accumulator table 18 adjacent the stack of bottles 14. FIG. 1 shows the apparatus 10 placing a last two-dimensional arrayed layer of bottles from a previous pallet of bottles on the accumulator table 18. FIG. 3 shows the apparatus positioned over the top layer of bottles 12 of the next stack of bottles 14 on the pallet 16 to be depalletized. As stated earlier and as will be explained, the glass bottle lifting and transferring apparatus 10 overcomes disadvantages associated with known bulk depallitizers by significantly reducing the supply of air under pressure needed to grip the rows of glass bottles 20 in each two-dimensional arrayed layer of glass bottles 12, to lift the gripped layer of glass bottles 12 from the stack of bottles 14, and then transfer the lifted layer of glass bottles 12 to the accumulator table 18.

Figure 4:
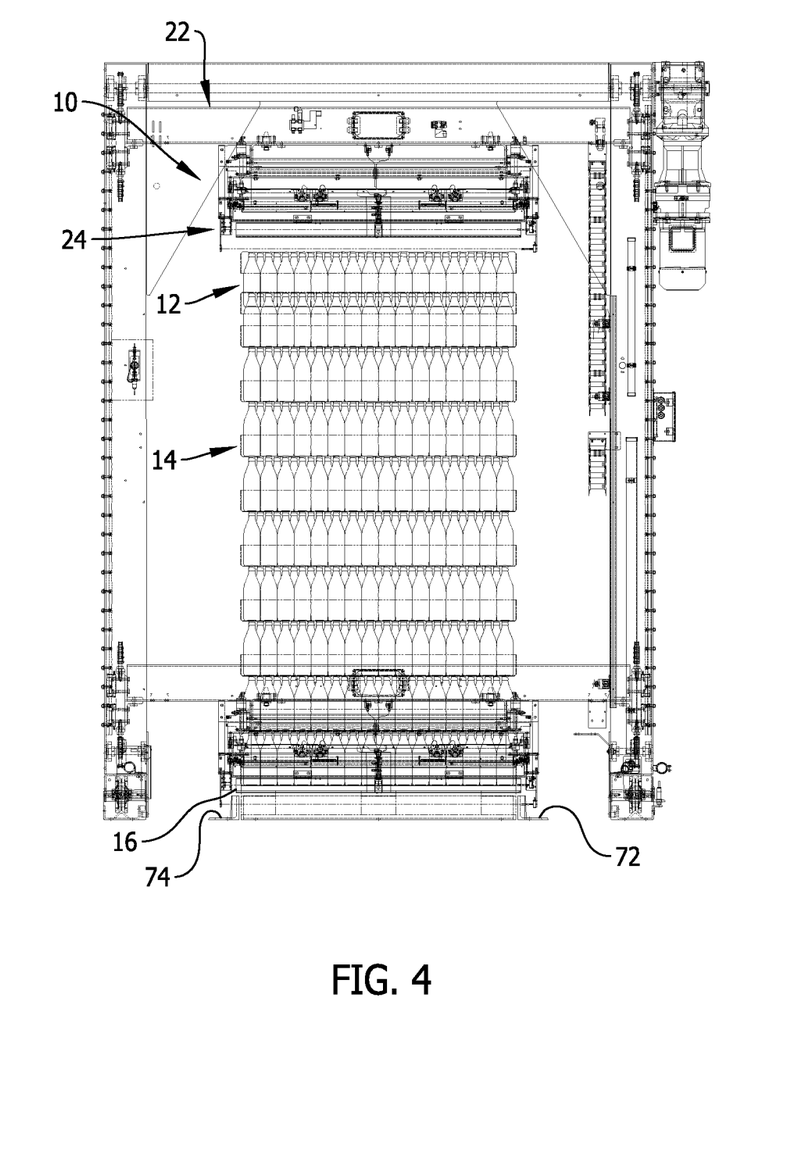
FIG. 4 is an end elevation view of the apparatus supported by the hoist device above the stack of bottles shown in FIG. 3.

The apparatus 10 includes a carrier assembly or carrier that is represented generally as 22 in FIGS. 1, 3, 4 and 5. The carrier 22 is operatively connected with and suspends a plurality of bottle gripping assemblies 24 of the apparatus. In operation of the apparatus, which is to be explained, the carrier 22 is moveable to suspend the plurality of gripping assemblies 24 above the stack of bottles 14 and above the accumulator table 18. The carrier 22 can have any rigid structure that is sufficient to support the plurality of bottle gripping assemblies 24 and a two-dimensional arrayed layer of bottles gripped by the gripping assemblies 24. The carrier 22 is moveable horizontally along a horizontal line of movement 26 represented in FIGS. 1 and 2 between a position of the carrier 22 above the accumulator table 18 as represented in FIG. 1, and a position of the carrier 22 above the top two-dimensional arrayed layer of bottles 12 stacked on the pallet 16 as represented in FIGS. 3 and 4. There is one bottle gripping assembly 24 for each row of bottles 20 in the top two-dimensional arrayed layer of bottles 12 stacked on the pallet 16. With the carrier 22 positioned above the stacked bottles 14 on the pallet 16, each gripping assembly 24 is positioned above a row of bottles 20 in the top two-dimensional arrayed layer of bottles 12 on the pallet 16.

The carrier 22 is also moveable along a first vertical line of movement 28 represented in FIG. 1 above the accumulator table 18, and a second vertical line of movement 30 represented in FIG. 1 above the stack of bottles 14 on the pallet 16.

A hoist device that is represented generally as 32 in FIGS. 1 and 3 supports the carrier 22. The hoist device 32 is operable to selectively move the carrier 22 vertically upward and move the carrier 22 vertically downward to respectively raise and lower the carrier 22 vertically along the first vertical line of movement 28, and selectively raise and lower the carrier 22 vertically along the second vertical line of movement 30. Hoist devices of this type are generally known and therefore the hoist device 32 is not described in detail herein.

Figure 2:
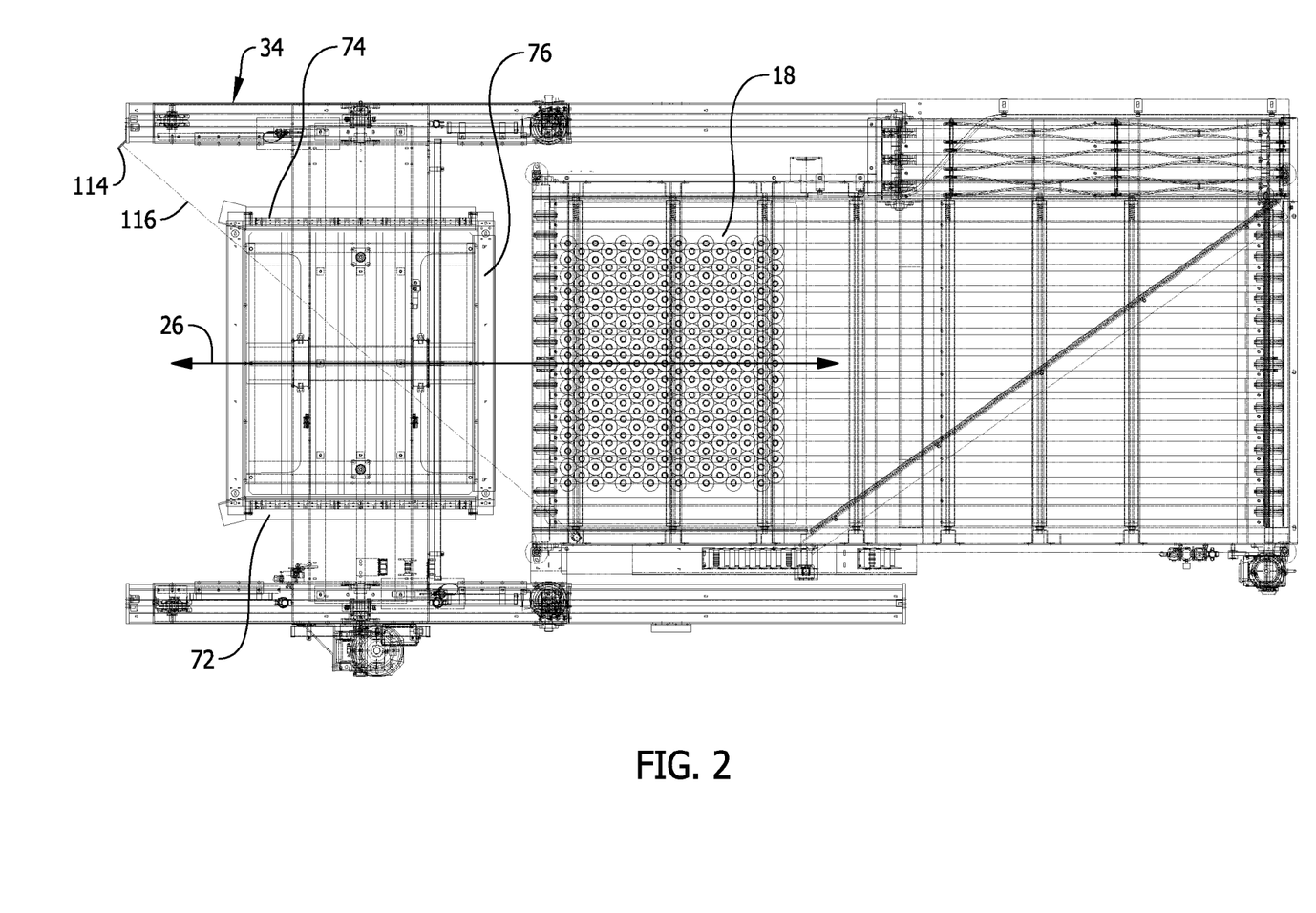
FIG. 2 is a top plan view of the accumulator table and its environment.

A motive device that is represented generally as 34 in FIGS. 1, 2 and 3 supports the hoist device 32. The motive device 34 is operable to selectively move the hoist device 32 and the carrier 22 horizontally in opposite first and second directions along the horizontal line of movement 26. Operation of the motive device 34 selectively positions the carrier 22 above the two-dimensional arrayed top layer of bottles 12 of the stack of bottles 14 on the pallet 16, and above the accumulator table 18. Motive devices of this type are generally known and therefore the motive device 34 is not described in detail herein.

Figure 5:
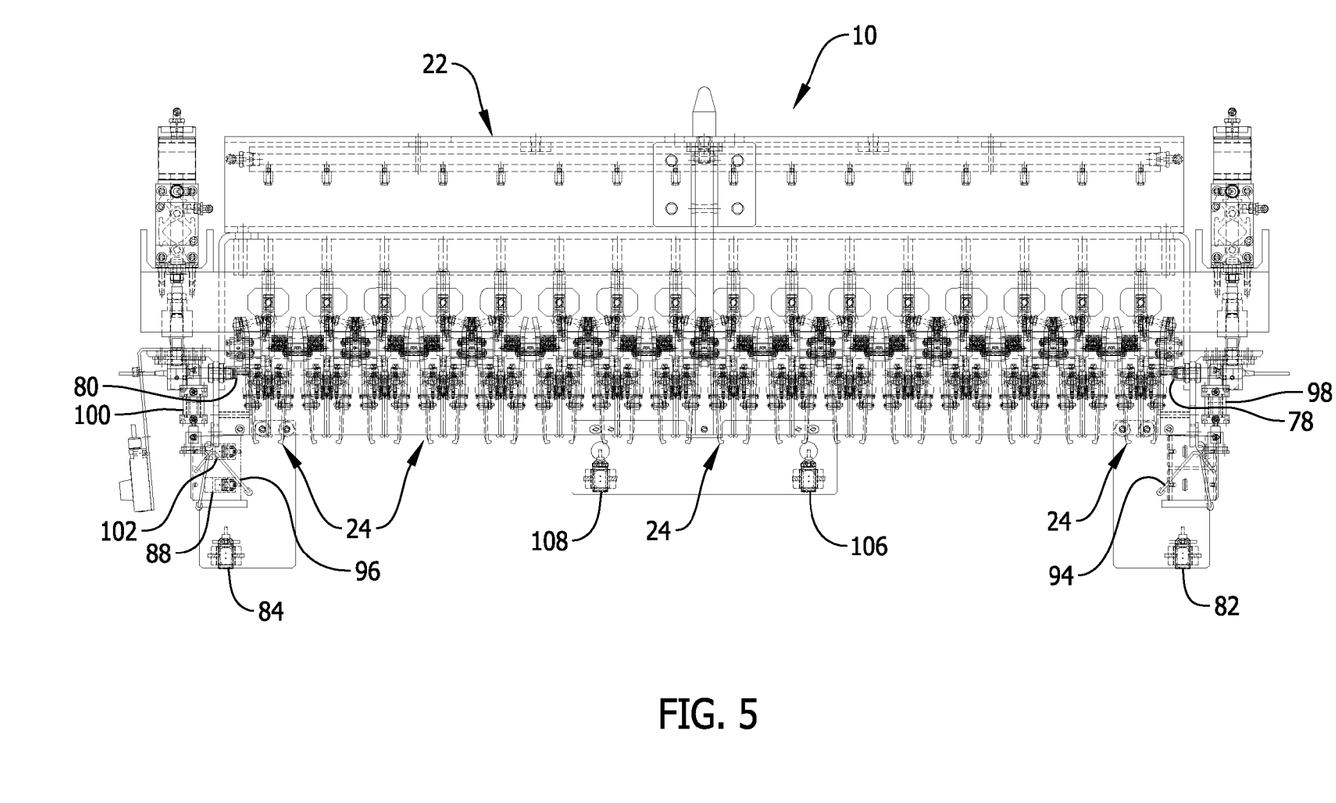
FIG. 5 is a side view of the apparatus removed from the hoist device.

FIG. 5 is an enlarged view of the apparatus 10 removed from the hoist device 32. As stated earlier, there is one bottle gripping assembly 24 for each row of bottles 20 in the top two-dimensional arrayed layer of bottles 12 stacked on the pallet. In the illustrated example, there are sixteen rows of bottles 20 in each layer of bottles on the pallet 16 and therefore there are sixteen bottle gripping assemblies 24. Each of the bottle gripping assemblies 24 is substantially the same. Therefore, only one of the bottle gripping assemblies 24 will be described in detail herein.

Figure 6:
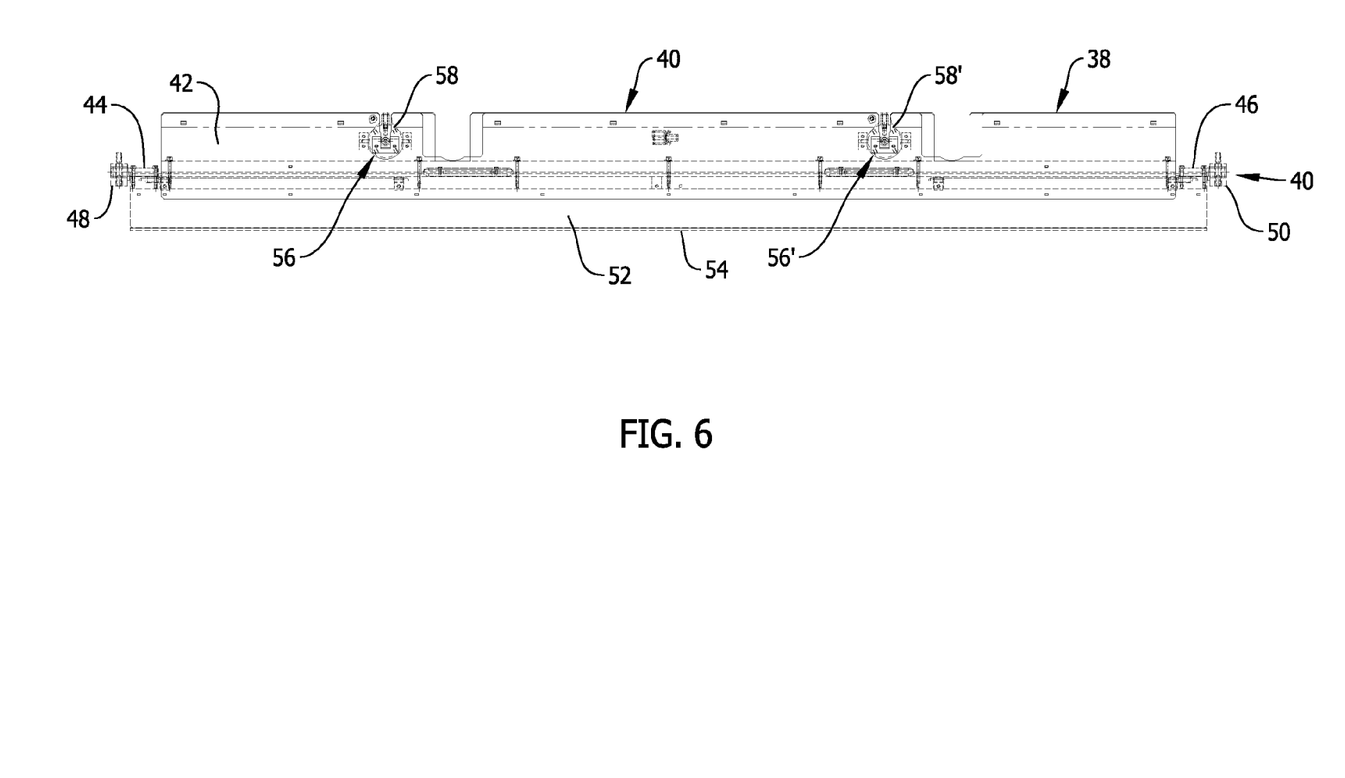
FIG. 6 is an end elevation view of one bottle gripping assembly of the apparatus.
Figure 7:
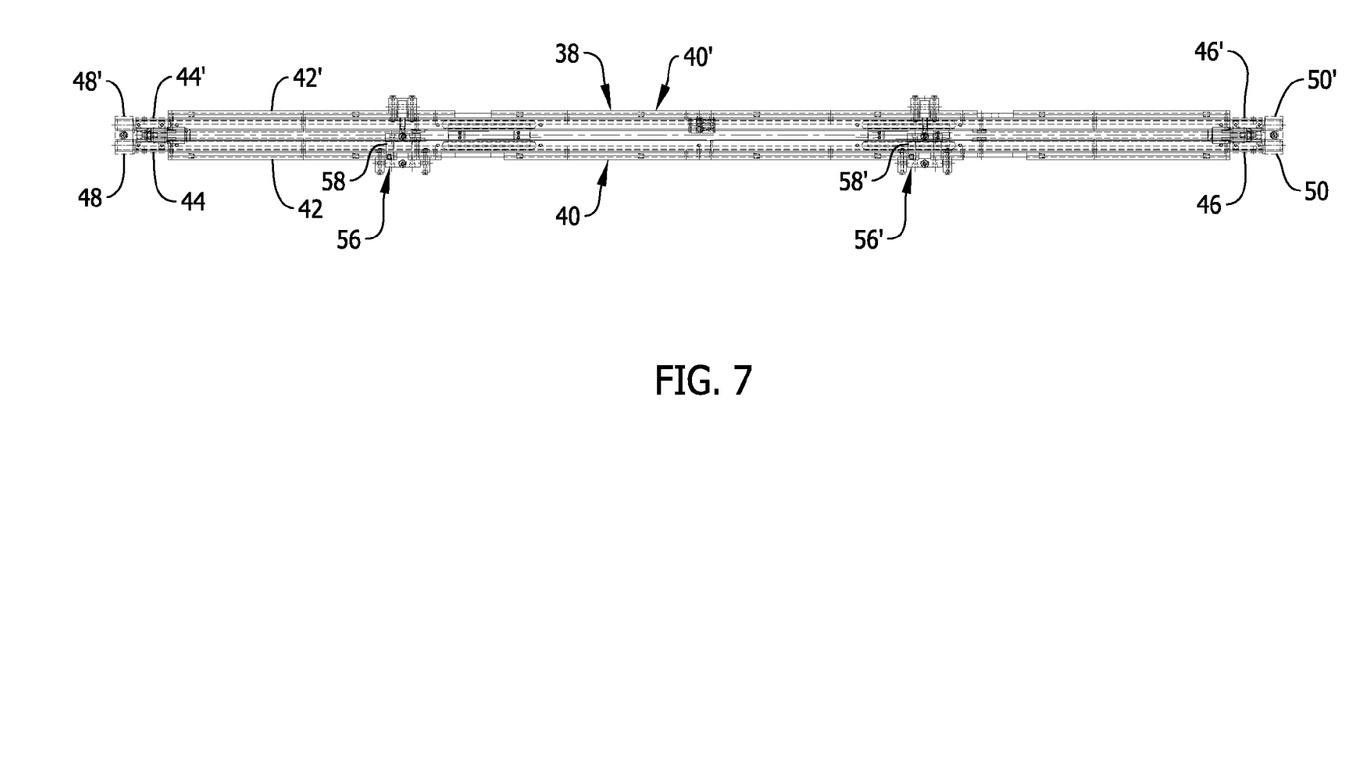
FIG. 7 is a top plan view of the bottle gripping assembly of FIG. 6.

FIG. 6 is a side elevation view of a single bottle gripping assembly 38. FIG. 7 is a top plan view of the bottle gripping assembly 38 shown in FIG. 6.

Figure 8:
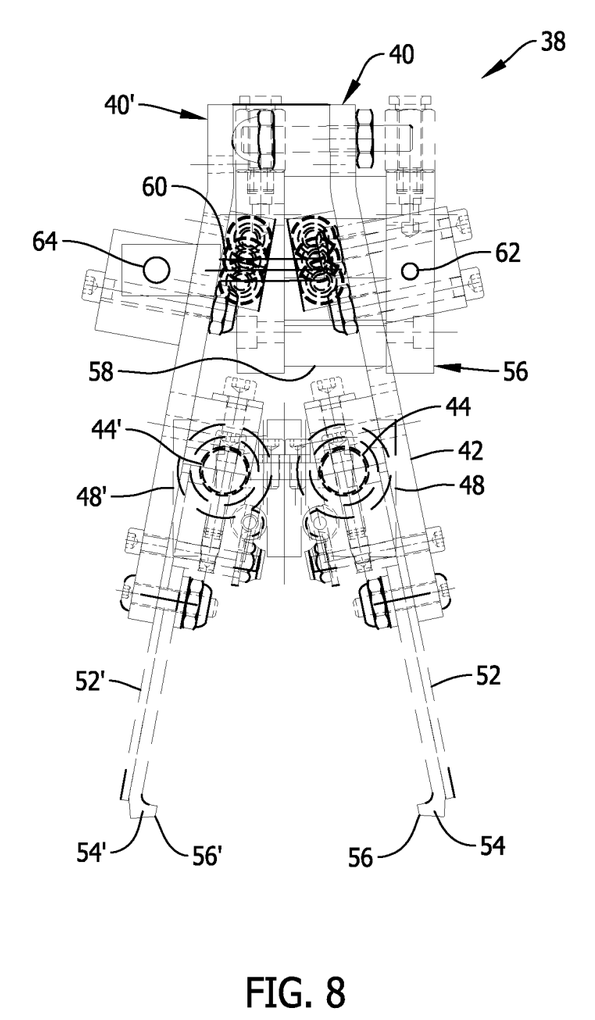
FIG. 8 is an enlarged end view of the bottle gripping assembly of FIG. 7 with the bottle gripping assembly at a first position of operation.
Figure 9:
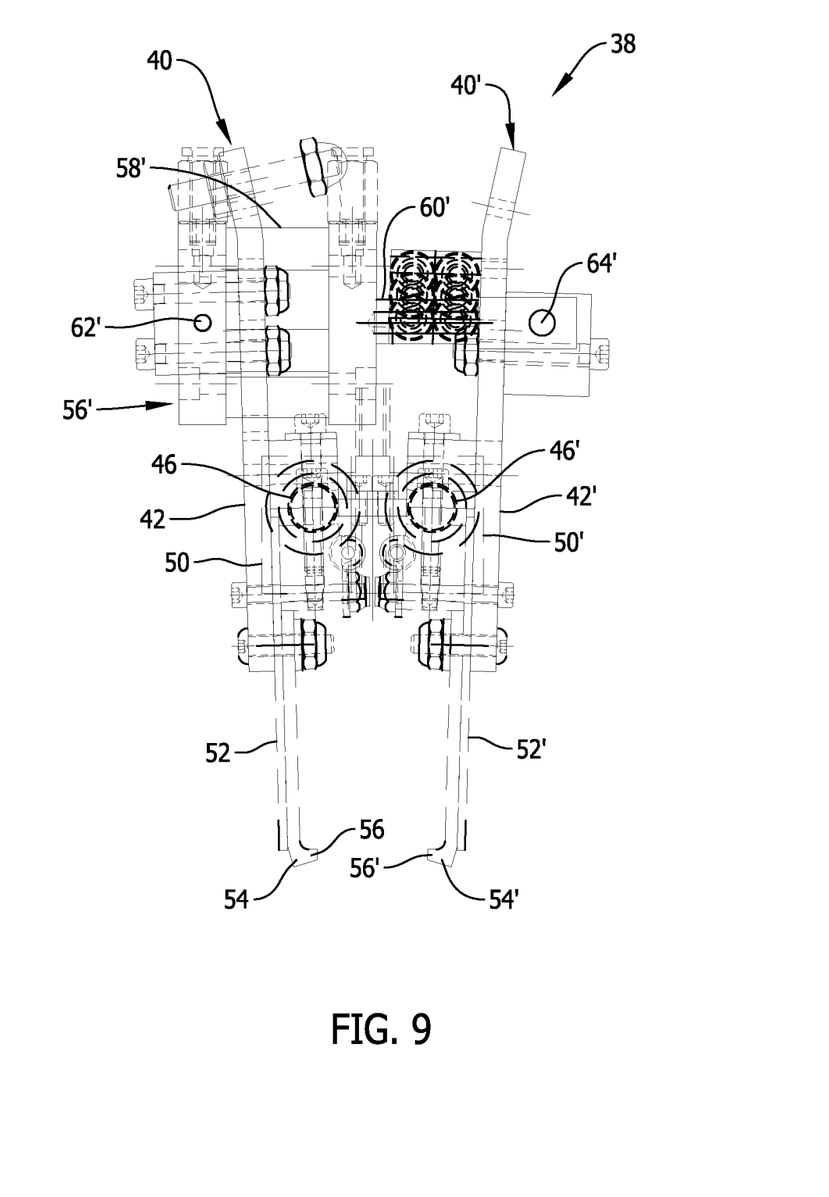
FIG. 9 is an end view of the bottle gripping assembly of FIG. 8 with the bottle gripping assembly at a second position of operation.

FIG. 8 is an enlarged end elevation view of the bottle gripping assembly 38 from the left side of the bottle gripping assembly 38 as shown in FIG. 6 with the bottle gripping assembly 38 in a first operative position. FIG. 9 is an end view of the bottle gripping assembly 38 from the right side of the bottle gripping assembly 38 as shown in FIG. 6 with the bottle gripping assembly 38 in a second operative position.

The bottle gripping assembly 38 is comprised of a first rail 40 and a second rail 40'. The first rail 40 and the second rail 40' are generally mirror images of each other. Therefore, only the first rail 40 is described in detail with the understanding that the opposite second rail 40' has generally the same construction with corresponding parts of the second rail 40' being identified by the same numbers used to reference parts of the first rail 40 with the reference numbers of the second rail 40' being followed by a prime (').

Each of the rails 40, 40' is comprised of an elongate, straight and generally rectangular base 42, 42' as represented in FIGS. 6 and 7. As can be seen in FIGS. 7-9, each base 42, 42' has a narrow thickness. Referring back to FIGS. 6 and 7, opposite ends of each base 42, 42' have pivot pins 44, 44', 46, 46' projecting from opposite ends of the base 42, 42'. The pivot pins 44, 44', 46, 46' are received in respective pivot blocks 48, 48', 50, 50' at the opposite ends of the base 42, 42'. The pivot blades 48, 48', 50, 50' float on the carrier and if any are moved slightly upwardly by any of the gripper assemblies contacting a bottle top, a photoelectric sensor is tripped and movement of the carrier downward is aborted. The pivot blocks 48, 48', 50, 50' mount the rail base 42, 42' and in turn a pair of rails 40, 40' to the carrier 22 for pivoting movement of the rails 40, 40' relative to the carrier 22. The rails 40, 40' are moveable by pivoting on the carrier 22 between a first operative position of the rails 40, 40' shown in FIG. 8 and a second operative position of the rails 40, 40' shown in FIG. 9. The rails 40, 40' are supported by the pivot pins 44, 44', 46, 46' on the carrier 22 with the rails 40, 40' being oriented substantially parallel and adjacent to each other and substantially perpendicular to the horizontal line of movement 26 and the first 28 and second 30 vertical lines of movement.

Referring to FIGS. 6, 8 and 9, each of the rails 40, 40' is also comprised of a stiffener 52, 52' that is attached to a respective rail base 42, 42'. As represented in FIGS. 6, 8 and 9, the stiffeners 52, 52' have elongate, straight and generally rectangular configurations that extend along the lengths of their attached rail base 42, 42' and depend downwardly from their attached rail base 42, 42'.

Each rail 40, 40' is also comprised of a gripper 54, 54'. As represented in FIGS. 6, 8 and 9, each gripper 54, 54' has an elongate, straight and generally rectangular configuration. As represented in FIGS. 8 and 9, each gripper 54, 54' has a cross-section configuration of a general L-shape with a gripper edge 56, 56' that angles inwardly at the bottom of each gripper 54, 54'. Each gripper 54, 54' is constructed as a strip of a resilient material that will flex outboard at the gripper edges 56, 56' when a force is applied to the edges 56, 56' and will allow the gripper edges 56, 56' to return to their original configurations when the force is removed.

Each bottle gripping assembly 38 is also comprised of at least one actuator 56. As represented in FIGS. 6 and 7, the illustrated bottle gripping assembly 38 is comprised of two actuators 56, 56'. The constructions of each of the actuators 56, 56' is the same, and therefore the construction of only one actuator 56 is described herein.

The actuator 56, 56' shown and to be described is a double acting pneumatic cylinder linear actuator. However, any other equivalent type of actuator could be used instead of the double acting pneumatic cylinder linear actuator 56, 56'. Actuator 56, 56' is comprised of a cylinder 58, 58' containing a piston (not shown) and a piston rod 60, 60' that projects from the cylinder 58, 58'. The cylinder 58, 58' is attached to one rail base 42 by a pivoting connection 62, for example a trunion pin. The piston rod 60, 60' is attached to the opposite rail base 42' by a pivoting connection 64, for example a piston rod end clevise. The actuator 56, 56' is operable to contract and move the first rail 40 and the second rail 40' to first operative relative positions where the grippers 54, 54' are spaced by a first horizontal distance between the first rail gripper 54 and the second rail gripper 54'. This first operative position of the pair of rails 40, 40' is represented in FIG. 8. The actuator 56 is also operable to extend and move the first gripper 54 and second gripper 54' toward each other to second operative relative positions of the rails 40, 40'. This second operative position of the pair of rails 40, 40' is represented in FIG. 9. In the second operative position there is a second horizontal distance between the first gripper 54 and the second gripper 54'. The second horizontal distance is smaller than the first horizontal distance.

In operation of the apparatus 10, the actuators 56, 56' of each bottle gripping assembly 38 are operated to move the first rail 40 and second rail 40' of each bottle gripping assembly away from each other to the first operative position represented in FIG. 8. The hoist device 32 is then operated to move the frame 22 and the plurality of bottle gripping assemblies 24 upwardly along the first vertical line of movement 28 to an elevation that enables the carrier 22 and the plurality of bottle gripping assemblies 24 to pass over the stack of bottles 14 on the pallet 16 positioned adjacent the accumulator table.

The motive device 34 is then operated to move the hoist device 32, the carrier 22 and the plurality of bottle gripping assemblies 24 along the horizontal line of movement 26 away from the accumulator table 18 and to a position where the plurality of bottle gripping assemblies 24 are above the stacked bottles 14 on the pallet 16 as represented in FIG. 4. This positions the plurality of bottle gripping assemblies 24 above the top two-dimensional arrayed layer of bottles 12 stacked on the pallet 16.

The apparatus is provided with three guiderails 72, 74, 76 that assist a forklift driver in positioning the pallet of stacked bottles 14 properly relative to the apparatus 10. The pallet 16 is positioned on the floor adjacent the apparatus 10 between side guiderails 72, 74 and against a rear guiderail 76.

During the operation of the apparatus 10, the stack of bottles 14 is checked by retroreflective or photoelectric switches to determine if the bottle stack 14 is properly placed and oriented for operation of the apparatus 10, or if the bottle stack 14 is skewed to one side or the other to an extent where the apparatus 10 will not operate properly.

Referring to FIG. 5, on opposite sides of the apparatus there are barrel detectors or photoelectric switches 78, 80. The barrel detectors include an emitter 78 and a receiver 80. The emitter sends a light beam horizontally across the pivot pins 46, 46' of each of the gripper assemblies 24 to the receiver 80. This beam detects any vertical movement of the pivot pins 46, 46' as the carrier 22 is lowered. Any vertical movement of any of the pins 46, 46', however slight, indicates that one or more of the gripper assemblies 24 has contacted the top of one or more of the bottles in the top layer of bottles 12. The downward movement of the carrier 22 is immediately aborted when such contact is detected. The carrier 22 immediately moves upwardly and an alarm is sent to the control system to indicate that a contact has occurred between one of the gripper assemblies 38 and the top layer of bottles.

An additional pair of photoelectric switches 82, 84 are provided on the opposite sides of the apparatus 10 as shown in FIG. 5. During downward movement of the carrier, these photoelectric switches 82, 84 look for alignment of the two outside rows of bottles in the top layer of bottles. The sensors 82, 84 send a beam across the opposite sides of the two outside rows of the top layer of bottles 12. If these sensors 82, 84 see light and are not blocked as the carrier 22 moves slowly downward, the carrier continues to move slowly downward. If any darkness is sensed by either one of the photoelectric switches 82, 84 it indicates that a bottle or one of the outside rows of bottles in the top layer 12 is slanted or curved outwardly and is in the way of the light beam. For example, if the photoelectric switch 84 on the left in FIG. 5 senses dark, and the photoelectric switch 82 on the right in FIG. 5 senses light, it means that the carrier 22 downward movement is slowed and the carrier is moved in short, quick shuttling movements to the left. This movement is done incrementally, very quickly, and for very short shuttle movements. While shuttling to the left, the photoelectric sensor 84 on the left in FIG. 5 senses light, and the photoelectric sensor 82 on the right in FIG. 5 senses light, it indicates that the carrier 22 has now been properly aligned with the top layer of bottles 12 on the stack 14.

If the photoelectric switch 82 on the right in FIG. 5 senses dark and the photoelectric switch 84 on the left in FIG. 5 senses light, the shuttling movements of the carrier 22 are to the right until both switches 82, 84 sense light.

If one or both of the photoelectric sensors 82, 84 continue to see dark as the carrier 22 is shuttled and moved slowly downward, the carrier 22 is continued to be moved downward and the shuttling of the carrier 22 is continued until a cross-site switch 88 is reached.

The cross-site photoelectric switch 88 is also shown in FIG. 5. This switch 88 emits a light beam diagonally and horizontally across the top layer of bottles 12. As the carrier 22 is continued to be moved slowly downward a light beam emitted by the cross-site 88 will be interrupted by the top layer of bottles 12 and the cross-site 88 will see dark. At this point, positioning flags 94, 96 on opposite sides of the carrier 22 as viewed in FIG. 5 are activated. The positioning flags are pivoted inwardly by cylinder assemblies 98, 100. The inward movement of the flags 94, 96 engages against any slanted or skewed bottle on the opposite sides of the top layer of bottles 12 or a curved or bowed row of bottles on the opposite sides of the top layer of bottles 12. The flags 94, 96 engage against and tuck in skewed or slanted bottles in the rows of bottles on the opposite sides of the top layer of bottles 12, or push in a curved or bowed row of bottles on opposite sides of the top layer of bottles 12. When the flags 94, 96 are in contact with the rows of bottles on opposite sides of the layer of bottles 12, the hoist 22 is raised to a predetermined height.

If after the flags 94, 96 are deployed against the opposite sides of the top row of bottles 12, both of the photoelectric sensors 82, 84 see light, the slow downward movement of the carrier 22 is restarted down.

Two additional photoelectric switches 106, 108, are positioned toward the center of the top layer of bottles 12. Each of these switches check for a small v-shape formed by the shoulders of two shoulders of adjacent bottles toward the center of the top bottle layer 12. If light is detected by these photoelectric switches 106, 108, the sensed light is an indication that the bottle gripping assemblies 38 are positioned properly relative to the top layer of bottles 12. If one or both of these photoelectric switches 106, 108 sense dark, it is an indication that the bottle gripping assemblies are not sufficiently aligned with the top layer of bottles 12. If one or both of these photoelectric switches 106, 108 detect dark, then the carrier 22 is again shuttled in very small increments of movements until light is sensed by the photoelectric switches 106, 108. The shuttling of the carrier to the left or right is done in the same manner as described earlier. The shuttling movements are conducted for a set number of movements. If after the set number of movements the photoelectric switches 106, 108 do not detect light, the carrier 22 immediately moves upwardly and an alarm is sent to the control system.

If light is sensed by the photoelectric switches 106, 108, the carrier assembly 22 is moved up quickly at a predetermined speed depending on the application, and then is moved slowly back down. The carrier 22 is moved downwardly, until a photoelectric switch 102 at the left side of the carrier 22 in FIG. 5 sees dark and the two photosensors 106, 108 sense light in the v-shapes at the top of the shoulders of two adjacent rows of bottles. The downward movement of the carrier 22 is quickly stopped. The carrier 22 is then properly positioned relative to the top layer of bottles 12 in the stack 14 for operation of the bottle gripping assemblies 38 to grip the bottles.

The actuators 56, 56' of each bottle gripping assembly 38 are then operated to extend and cause the first rail 40 and second rail 40' of each gripping assembly 38 to move from their first operative positions with the first horizontal distance spacing between the grippers 54, 54' of each bottle gripping assembly 38 as represented in FIG. 8, to their second operative positions with the second horizontal spacing between the grippers 54, 54' of the bottle gripping assembly 38 represented in FIG. 9. This results in the grippers 54, 54' of the first rail 40 and the second rail 40' of each bottle gripping assembly 38 engaging against opposite sides of the bottles in each row of bottles 20 in the top layer of bottles 12 stacked on the pallet 16. Each of the first rail 40 and second rail 40' of the plurality of bottle gripping assemblies 24 through their respective grippers 54, 54' firmly grip a row of bottles 20 between the first 40 and second 40' rails as represented in FIG. 3.

The hoist device is then operated to move the frame carrier 22 and the plurality of gripping assemblies 24 vertically upward along the second vertical line of movement 30. This lifts the rows of bottles 20 in the top layer of bottles 12 stacked on the pallet 16 above the remaining bottles stacked on the pallet.

The motive device 34 is then operated to move the hoist device 32, the frame carrier 22, and the rows of bottles 20 now gripped by the plurality of gripping assemblies 24 horizontally along the horizontal line of movement 26 until the gripped rows of bottles 20 are positioned above the accumulator table 18.

The hoist device 32 is then operated to move vertically downwardly along the first vertical line of movement 28 to position the gripped rows of bottles 20 on the accumulator table 18. With the gripped rows of bottles 20 positioned on the accumulator table 18, the actuators 56, 56' of each bottle gripping assembly 38 are then operated to contract and move the pairs of first 40 and second 40' rails of each bottle gripping assembly 38 to their first operative positions as represented in FIG. 8, thereby releasing the rows of bottles 20 from the plurality of gripper assemblies 24.

The hoist device 32 then elevates the frame carrier 22 and the plurality of bottle gripper assemblies 24 vertically upward along the first vertical line of movement 28 to a height above the top layer of bottles in the remaining stack of bottles on the pallet 16. The sequences described above are then repeated to grip the top most layer of bottles remaining on the stack of bottles on the pallet 16 and move the top most layer of bottles to the accumulator table 18.

In the above manner, the apparatus 10 enables depalletizing rows of bottles from a stack of bottles on a pallet without requiring a substantial supply of air under pressure as was needed in prior depalletizing apparatus. In contrast, the apparatus 10 needs only a small supply of pressurized air to operate the actuators 56, 56' associated with each of the first 40 and second 40' rails of each bottle gripping assembly 38.

Referring to FIG. 2, a photoelectric sensor 114 is provided on the apparatus 10 at a position toward the bottom of the apparatus. The photoelectric sensor 114 is positioned to emit a beam 116 diagonally across the bottles in the last layer on the pallet 16. When the photoelectric sensor 114 senses light diagonally across the last layer of bottles on the pallet, it provides a signal to the control system of the apparatus 10 indicating that the last layer of bottles has been removed from the pallet 16. The apparatus 10 then waits until another pallet of bottles is positioned between the pallet guide rails 72, 74, 76 and is sensed by the photoelectric sensor 114.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An apparatus that is operable to move a layer of bottles from a first area to a second area, the apparatus comprising:
    a carrier that is moveable vertically and horizontally relative to the bottles;
    a plurality of bottle gripping assemblies on the carrier, each bottle gripping assembly comprising a first rail and a second rail supported by the carrier for vertical movement of the first rail and the second rail with vertical movement of the carrier and for horizontal movement of the first rail and the second rail with horizontal movement of the carrier;
    at least one actuator connected to the first rail and the second rail, the at least one actuator being operable to move the first rail and the second rail to first operative positions where there is a first distance between the first rail and the second rail and to move the first rail and the second rail to second operative positions where there is a second distance between the first rail and the second rail, the second distance being smaller than the first distance, the at least one actuator being operable to move the first rail and the second rail to the first operative positions, the carrier being operable to move horizontally to position the first rail and the second rail above a row of bottles in the layer of bottles, the carrier then being operable to move vertically to position the first rail and the second rail on opposite sides of the row of bottles, the at least one actuator then being operable to move the first rail and the second rail to the second operative positions where the first rail and the second rail engage against and grip opposite sides of the row of bottles;
    the carrier then being operable to move vertically to lift the row of bottles, the carrier then being operable to move horizontally to transfer the row of bottles from the first area to the second area;
    pivot pins at opposite ends of the first rail;
    pivot blocks at opposite ends of the first rail, the pivot blocks at the opposite ends of the first rail mount the pivot pins at the opposite ends of the first rail on the carrier for pivoting movement of the first rail relative to the carrier, the pivot blocks float on the carrier and are free to move vertically relative to the carrier;
    pivot pins at opposite ends of the second rail;
    pivot blocks at opposite ends of the second rail, the pivot blocks at the opposite ends of the second rail mount the pivot pins at the opposite ends of the second rail on the carrier for pivoting movement of the second rail relative to the carrier, the pivot blocks at the opposite ends of the second rail float on the carrier and are free to move vertically relative to the carrier;
    photoelectric switches on the carrier, the photoelectric switches being positioned on opposite sides of the plurality of bottle gripping assemblies, the photoelectric switches send light beams horizontally across the pivot pins and the pivot blocks of each of the bottle gripping assemblies and are operable to detect any upward vertical movement of the pivot pins and pivot blocks that indicates one of the bottle gripping assemblies has contacted a top of a bottle as the carrier is moved vertically to position the first rail and the second rail on opposite sides of the row of bottles and cause downward movement of the carrier to stop in response to the detected upward vertical movement of a pivot pin and pivot block.

2. The apparatus of claim 1, further comprising:
the first rail and the second rail being mirror images of each other.

3. The apparatus of claim 1, further comprising:
the at least one actuator being a pneumatic double-acting cylinder actuator.

4. The apparatus of claim 1, further comprising:
the first rail including a first resilient strip on the first rail, the first resilient strip being positioned on the first rail to engage against the row of bottles; and,
the second rail including a second resilient strip on the second rail, the second resilient strip being positioned on the second rail to engage against the row of bottles.

5. The apparatus of claim 1, further comprising:
a hoist device operatively connected to the carrier, the hoist device being operable to selectively move the carrier vertically upward and move the carrier vertically downward.

6. The apparatus of claim 5, further comprising:
a motive device operatively connected to the hoist device, the motive device being operable to selectively move the hoist device horizontally along a line of movement in a first direction and move the hoist device horizontally along the line of movement in a second direction, the second direction being opposite the first direction.

7. The apparatus of claim 6, further comprising:
the first rail and the second rail being substantially perpendicular to the line of movement.

8. The apparatus of claim 1, further comprising:
additional photoelectric switches on the carrier, the additional photoelectric switches being positioned on opposite sides of the plurality of bottle gripping assemblies, the additional photoelectric switches send light beams across opposite sides of the layer of bottles and are operable to detect any bottle in an outside row of bottles of the layer of bottles that is positioned outwardly from the outside row of bottles of the layer of bottles as the carrier is moved vertically to position the first rail and the second rail on opposite sides of the row of bottles and cause downward movement of the carrier to be slowed in response to detecting the bottle positioned outwardly from the outside row of bottles of the layer of bottles; and,
the carrier being operable to move sideways toward the bottle positioned outwardly from the outside row of bottles until the additional photoelectric switch detecting the bottle positioned outwardly from the outside row of bottles no longer detects the bottle positioned outwardly from the outside row of bottles.

9. The apparatus of claim 8, further comprising:
positioning flags on the carrier, the positioning flags being positioned on opposite sides of the plurality of bottle gripping assemblies, the positioning flags being operable in response to the additional photoelectric switches detecting a bottle in an outside row of bottles in a layer of bottles being positioned outwardly from the outside row of bottles to move toward the outside rows of bottles in the layer of bottles and push the bottle positioned outwardly from the outside row of bottles back into the outside row of bottles.

10. The apparatus of claim 9, further comprising:
further photoelectric switches on the carrier, the further photoelectric switches being positioned toward a center of the carrier, the further photoelectric switches send light beams over the layer of bottles between a v-shaped gap formed by shoulders of adjacent bottles in the layer of bottles and are operable to detect the bottle gripping assemblies not being aligned with the layer of bottles as the carrier is moved vertically to position the first rail and the second rail on opposite sides of the row of bottles and to cause downward movement of the carrier to be slowed in response to detecting the bottle gripping assemblies not being aligned with the layer of bottles; and,
the carrier being operable to move sideways until the further photoelectric switches detect the bottle gripping assemblies being aligned with the layer of bottles.

11. An apparatus that is operable to move a layer of bottles from a first area to a second area, the apparatus comprising:
a carrier that is movable vertically along a vertical line of movement relative to the layer of bottles and is movable horizontally along a horizontal line of movement relative to the layer of bottles;
a plurality of bottle gripping assemblies on the carrier, each bottle gripping assembly comprising a first rail having an elongate, straight length and a second rail having an elongate, straight length, the first rail and the second rail being supported by the carrier for vertical movement of the first rail and the second rail with vertical movement of the carrier and for horizontal movement of the first rail and the second rail with horizontal movement of the carrier, the first rail and the second rail being substantially parallel and being substantially perpendicular to the vertical line of movement and the horizontal line of movement;
at least one actuator operatively connected to the first rail and the second rail, the at least one actuator being operable to move the first rail and the second rail to first relative positions where there is a first horizontal distance between the first rail and the second rail and the actuator being operable to move the first rail and the second rail to second relative positions where there is a second horizontal distance between the first rail and the second rail, the second horizontal distance being smaller than the first horizontal distance, the at least one actuator being operable to move the first rail and the second rail to their first relative positions, the carrier being operable to move horizontally along the horizontal line of movement to position the first rail and the second rail above a row of bottles in the layer of bottles, the carrier then being operable to move vertically along the vertical line of movement to position the first rail and the second rail on opposite sides of the row of bottles, the at least one actuator then being operable to move the first rail and the second rail to their second relative positions where the first rail the second rail engage against and grip opposite sides of the row of bottles;
the carrier then being operable to move vertically along the vertical line of movement and lift the row of bottles, the carrier then being operable to move horizontally along the horizontal line of movement to transfer the row of bottles from the first area to the second area;
pivot pins at opposite ends of the first rail;
pivot blocks at opposite ends of the first rail, the pivot blocks at the opposite ends of the first rail mount the pivot pins at the opposite ends of the first rail on the carrier for pivoting movement of the first rail relative to the carrier, the pivot blocks float on the carrier and are free to move vertically relative to the carrier;

pivot pins at opposite ends of the second rail;
pivot blocks at opposite ends of the second rail, the pivot blocks at the opposite ends of the second rail mount the pivot pins at the opposite ends of the second rail on the carrier for pivoting movement of the second rail relative to the carrier, the pivot blocks at the opposite ends of the second rail float on the carrier and are free to move vertically relative to the carrier;
photoelectric switches on the carrier, the photoelectric switches being positioned on opposite sides of the plurality of bottle gripping assemblies, the photoelectric switches send light beams horizontally across the pivot pins and the pivot blocks of each of the bottle gripping assemblies and are operable to detect any upward vertical movement of the pivot pins and pivot blocks that indicates one of the bottle gripping assemblies has contacted a top of a bottle as the carrier is moved verticals to position the first rail and the second rail on opposite sides of the row of bottles and cause downward movement of the carrier to stop in response to the detected upward vertical movement of a pivot pin and pivot block.

12. The apparatus of claim 11, further comprising:
the vertical line of movement being a first vertical line of movement; and,
the frame being movable vertically along a second vertical line of movement, the second vertical line of movement being spaced horizontally from the first vertical line of movement.

13. The apparatus of claim 11, further comprising:
the at least one actuator being a pneumatic double-acting cylinder actuator.

14. The apparatus of claim 11, further comprising:
the first rail including a first resilient strip on the first rail, the first resilient strip being positioned on the first rail to engage against the row of bottles; and,
the second rail including a second resilient strip on the second rail, the second resilient strip being positioned on the second rail to engage against the row of bottles.

15. The apparatus of claim 11, further comprising:
a hoist device operatively connected to the frame, the hoist device being operable to selectively move the frame vertically upward along the vertical line of movement and move the frame vertically downward along the vertical line of movement.

16. The apparatus of claim 15, further comprising:
a motive device operatively connected to the hoist device, the motive device being operable to selectively move the hoist device horizontally along the horizontal line of movement in a first direction and move the hoist device horizontally along the horizontal line of movement in a second direction, the second direction being opposite the first direction.

17. The apparatus of claim 11, further comprising:
the first rail and the second rail being substantially perpendicular to the horizontal line of movement.

18. The apparatus of claim 11, further comprising:
additional photoelectric switches a on the carrier, the additional photoelectric switches being positioned on opposite sides of the plurality of bottle gripping assemblies, the additional photoelectric switches send light beams across opposite sides of the layer of bottles and are operable to detect any bottle in an outside row of bottles of the layer of bottles that is positioned outwardly from the outside row of bottles of the layer of bottles as the carrier is moved vertically to position the first rail and the second rail on opposite sides of the row of bottles and cause downward movement of the carrier to be slowed in response to detecting the bottle positioned outwardly from the outside row of bottles of the layer of bottles; and,
the cagier being operable to move sideways toward the bottle positioned outwardly from the outside row of bottles until the additional photoelectric switch detecting the bottle positioned outwardly from the outside row of bottles no longer detects the bottle positioned outwardly from the outside row of bottles.

19. The apparatus of claim 18, further comprising:
positioning flags on the carrier, the positioning flags being positioned on opposite sides of the plurality of bottle gripping assemblies, the positioning flags being operable in response to the additional photoelectric switches detecting a bottle in an outside row of bottles in a layer of bottles being positioned outwardly from the outside row of bottles to move toward the outside rows of bottles in the layer of bottles and push the bottle positioned outwardly from the outside row of bottles back into the outside row of bottles.

20. The apparatus of claim 19, further comprising
further photoelectric switches on the carrier, the further photoelectric switches being positioned toward a center of the carrier, the further photoelectric switches send light beams over the layer of bottles between a v-shaped gap formed by shoulders of adjacent bottles in the layer of bottles and are operable to detect the bottle dipping assemblies not being aligned with the layer of bottles as the carrier is moved vertically to position the first rail and the second rail on opposite sides of the row of bottles and to cause downward movement of the carrier to be slowed in response to detecting the bottle gripping assemblies not being aligned with the layer of bottles; and,
the carrier being operable to move sideways until the further photoelectric switches detect the bottle gripping assemblies being aligned with the layer of bottles.

* * * * *